United States Patent [19]

Carter

[11] Patent Number: 5,199,362
[45] Date of Patent: Apr. 6, 1993

[54] POLLUTION CONTROL METHOD AND APPARATUS

[76] Inventor: Lee R. Carter, 3920 SW. 30th St., Lot C-41, Ocala, Fla. 32674

[21] Appl. No.: 799,283

[22] Filed: Nov. 27, 1991

[51] Int. Cl.$^5$ ............................................. F23B 5/00
[52] U.S. Cl. ................................. 110/211; 110/215; 110/216; 110/203; 110/345; 431/5; 431/202
[58] Field of Search ............... 431/5, 202; 110/203, 110/206, 210, 211, 214, 215, 216, 345; 55/80, 404, 405, 318, 320, 267

[56] References Cited

U.S. PATENT DOCUMENTS

| | | | |
|---|---|---|---|
| 4,419,942 | 12/1983 | Johnson | 110/203 X |
| 4,430,950 | 2/1984 | Foresto | 110/211 X |
| 4,843,979 | 7/1989 | Phillips | 110/203 X |
| 5,050,508 | 9/1991 | Wilson | 110/203 X |
| 5,088,424 | 2/1992 | Sardari et al. | 110/214 |

Primary Examiner—Larry Jones
Attorney, Agent, or Firm—Hopkins & Thomas

[57] ABSTRACT

A pollution control system for removing harmful elements from industrial smoke streams comprises a reciprocating pump assembly that draws smoke from a furnace or the like and delivers it through a passageway where the smoke is treated sequentially to remove harmful elements therefrom. Disposed along the passageway is an atomizer station, a first fibrous filter, an ignition chamber, and a second fibrous filter. Having traversed the passageway, the smoke is ejected into a large tank of water and bubbles to the surface thereof, thus being further cleansed. From the water tank, the cleansed smoke stream moves up a stack, through a final fibrous filter, and into the atmosphere where it poses a substantially reduced environmental hazard.

3 Claims, 1 Drawing Sheet

POLLUTION CONTROL METHOD AND APPARATUS

TECHNICAL FIELD

This invention relates in general to pollution control and more particularly to methods and devices for removing harmful gases and particulates from industrial smoke prior to its release into the atmosphere.

BACKGROUND OF THE INVENTION

The world industrial revolution has led to widespread and unrestricted industrial burning of fossil fuels and other combustible materials. For industrial use in steam generators, boilers, furnaces, and the like, such fossil fuels have included hard and soft coal, wood, propane, natural gas, and, sometimes, combinations of these fuels. In addition to the burning of industrial fuels, improvements in incineration techniques and environmental concerns related to the alarming growth of landfills has resulted in the incineration or burning of many other types of materials such as, for example, garbage, tires, medical wastes, used motor oil, paint thinner, and cleaning fluid.

While the burning of fossil fuels and the incineration of waste materials have been important factors in sustaining modern society, such burning also tends to produce immense quantities of harmful by-products that are often simply released directly into the atmosphere. Such by-products can include carbon dioxide, which can contribute to greenhouse warming of the planet and destruction of its protective ozone layer; sulphur and other gases that can cause highly destructive acid rain; lead, mercury, and other toxic metals and metal oxides that can accumulate in the human body; and various fine particulate matter that can precipitate to the ground and harm plants and animals.

For many years, the harmful affects of industrial burning were not recognized and the by-products of such burning were simply belched into the atmosphere in tremendous volumes. More recently, however, a growing world concern for the well being of our planet and its inhabitants has led to a heightened awareness on the part of government and industry of the need to reduce the atmospheric pollution resulting from industrial burning.

Numerous attempts have been made to remove and eliminate harmful elements from industrial smoke before it is released into the atmosphere. Such attempts include filter type scrubbers through which the smoke is passed to remove particulates therefrom, various chemical treatments to render harmful elements within the smoke inert, increasing the actual burning efficiency of the fuels to produce less harmful by-products, and others.

Although these and similar attempts have proven somewhat successful in reducing the volume of harmful materials introduced into the atmosphere, they nevertheless have not been completely successful and, further, tend to be plagued with a number of inherent problems and shortcomings. Filter scrubbers, for example, tend to be very expensive to maintain and operate and can require frequent removal and replacement of the filter elements themselves. Chemical treatments tend to be effective only upon a limited range of harmful elements and can even produce compounds whose affect on the atmosphere are themselves understood only poorly. Also, while improving the efficiency of the actual burning process itself indeed reduces pollutants, unacceptably large amounts of harmful elements still can be introduced into the atmosphere.

Therefore, a persistent and heretofore unaddressed need exists for a method and apparatus adapted to remove a wide range of harmful elements from industrial smoke streams reliably, efficiently, and economically without producing harmful by-products of its own. It is to the provision of such a method and apparatus that the present invention is primarily directed.

SUMMARY OF THE INVENTION

Briefly described, the present invention, in a preferred embodiment thereof, comprises a pollution control system adapted to draw smoke from an industrial burner such as a furnace, boiler, or incinerator, and cleanse the smoke of undesirable or harmful elements prior to releasing it into the atmosphere. The system includes a large pump having a reciprocating piston disposed therein. The pump is coupled to the source of industrial smoke and is adapted to draw the smoke from the source and deliver it to and through an elongated passageway for treatment.

As the smoke traverses the passageway, it is bombarded with a fine fluid mist, which tends to collect and precipitate out of the smoke certain particulate matter suspended therein.

The smoke is next passed through a fibrous filter and thence through an ignition chamber, where flammable elements within the smoke are ignited and reduced to harmless compounds. The smoke is then passed through a second fibrous filter, which tends to remove any remaining particulate matter or particulates that were created during the burning of the smoke at the ignition chamber.

From the passageway, the smoke is directed downwardly to the bottom of a liquid storage tank, where the smoke is expelled into the liquid and bubbles up to the surface thereof. The bubbling process tends to scrub the smoke of harmful metals and other particulates, which remain in the water and can be drained away.

From the liquid storage tank, the smoke passes through a stack and through a final fibrous filter before being expelled into the atmosphere as a harmless mist having very little remaining particulates and gases that contribute to atmospheric pollution.

Thus, it is an object of this invention to provide a pollution control device that removes harmful gases, particulates, and other matter from industrial smoke streams reliably and efficiently.

Another object of the invention is to provide an apparatus of the type described that is economical to produce and maintain.

A further object of the invention is to provide a pollution control method and apparatus that can be implemented easily in existing industrial burners and the like.

A still further object of the invention is to contribute to the preservation and conservation of the environment.

These and other objects, features, and advantages of this invention will become more apparent upon review of the detailed description set forth below taken in conjunction with the following drawing figures.

DETAILED DESCRIPTION OF THE PREFERRED EMBODIMENT

Figure 1:
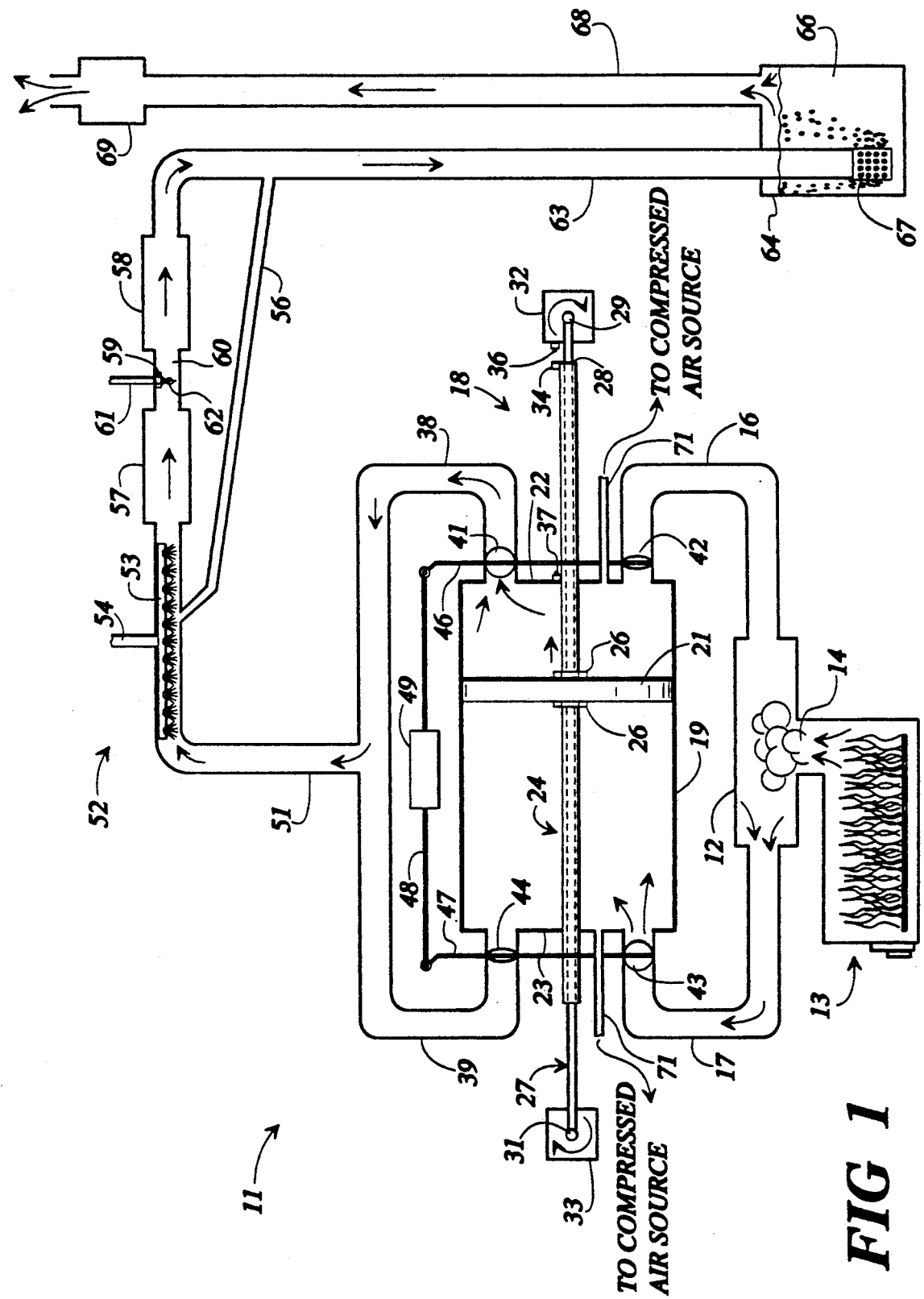
FIG. 1 is a functional schematic diagram illustrating a preferred apparatus for implementing the method of this invention.

Referring now to the drawing figure, an apparatus 11 is provided for removing harmful elements from an industrial smoke stream according to principles of this invention. The apparatus 11 comprises a plenum chamber 12 adapted to be coupled to receive smoke from an industrial burner 13 such as a boiler, furnace, or incinerator, in which fuel, waste, or other material is burned to produce smoke 14.

A large reciprocating pump assembly 18 has a cylindrical chamber 19 with an internal piston 21 disposed therein. The chamber 19 has an upstream end 22 and a downstream end 23. The piston 21 is securely mounted on a rigid elongated piston rod 24 that slidably extends through the upstream and downstream ends 22 and 23 of the cylindrical chamber 19 respectively as shown. The piston 21 is mounted to the piston rod 24 by means of appropriate collars 26 or other suitable fasteners such that the piston 21 is immovable with respect to the piston rod 24.

The piston rod 24 is preferably hollow with a longitudinal passageway extending therethrough from one end of the rod to the other. Two flights of a continuous drive chain or cable 27 extend through the longitudinal passageway of the piston rod 24 with the ends of the drive cable extending beyond the ends of the piston rod 24. The cable 27 is secured at a predetermined position to the piston rod 24 by means of an appropriate securing bracket 28.

The ends of drive cable 27 extend around respective sprockets or sheaves 29 and 31 that, in turn, are coupled to be driven by corresponding drive motors 32 and 33. With this configuration, it will be clear that when drive motor 32 is activated to rotate its sheave in a clockwise direction, the piston rod 24 is pulled to the right in FIG. 1 causing the piston 21 to move toward the upstream end 22 of the chamber 19. Conversely, when drive motor 33 is activated to rotate its sheave 31 in a counter-clockwise direction, the piston rod 24 will be pulled to the left in FIG. 1, causing the piston 21 to move toward the downstream end 23 of the chamber 19. Thus, alternating activation of the drive motors 32 and 33 causes the piston 21 to reciprocate back and forth within the chamber 19.

A tang 34 is provided on one end of the piston rod 24 and opposed contact switches 36 and 37 are mounted on the drive mechanism 32 and the upstream end of cylinder 19 as shown. The switch 36 is positioned to be engaged by the tang 34 when the piston 21 is at the rightmost extent of its length of travel within the chamber 19 as seen in FIG. 1. Conversely, the switch 37 is positioned to be engaged by the tang 34 when the piston 21 is at the leftmost extent of its length of travel.

The switches 36 and 37 are coupled to appropriate control means (not shown) such that contact between the tang 34 and the switch 36 deactivates drive motor 32 and activates drive motor 33. In contrast, contact between the tang 34 and the switch 37 deactivates drive motor 33 and activates drive motor 32. In this way, the piston 21 is continuously and automatically reciprocated by th drive motors 32 and 33 between the rightmost and leftmost extent of its travel within the cylindrical chamber 19 to facilitate pumping action of the assembly 18 as detailed more fully below.

Intake ducts 16 and 17 communicate between the plenum chamber 12 and the upstream and downstream ends of the cylindrical chamber 19 respectively. Similarly, exhaust ducts 38 and 39 communicate between the upstream and downstream ends of the chamber 19 and subsequent stations of the present invention as described more fully below. Butterfly valve assemblies 41, 42, 43, and 44 are disposed in respective ones of the intake and exhaust ducts adjacent to their point of attachment to the cylindrical chamber 19 as shown.

Valves 41 and 42 are coupled together by means of a linkage 46 and valves 43 and 44 are also coupled together by means of a linkage 47. Linkages 46 and 47, in turn, are coupled together by a linkage rod 48 to move in unity with one another upon movement of the linkage rod as indicted by the arrow in FIG. 1. The valves 41, 42, 43, and 44 are oriented on their respective linkages 46 and 47 such that when the linkage rod 48 is in its leftmost position as shown in FIG. 1, valves 41 and 43 are open while valves 42 and 44 are closed. When the linkage rod 48 is moved to its rightmost position as seen in FIG. 1, valves 42 and 44 are opened while valves 41 and 43 are closed. A double acting solenoid 49 is provided for selective movement of the linkage rod 48 to the left or right to open and close the butterfly valves as indicated. The control means is coupled to the solenoid 49 to move the linkage rod 48 to the left as the piston moves toward the upstream end 22 of the cylinder 19 and to the right as the piston moves toward the downstream end 23 of the cylinder 19.

The exhaust ducts 38 and 39 communicate with a conduit 51 that, in turn, is coupled to deliver smoke to a treatment station generally indicated at 52 for treatment. The treatment station 52 comprises an elongated passageway that is traversed by the smoke as it is delivered from the pump assembly 18. In traversing the passageway, the smoke moves sequentially passed an atomizer 53 that is fed from a high pressure water source (not shown) through a water pipe 54. The atomizer is adapted to spray a fine mist of water through the smoke stream as it traverses the passageway. A drain 56 is provided to drain off water from the mist that collects in the passageway.

Having moved past the atomizer 53 in the passageway, the smoke traverses a fibrous or other suitable filter 57 and thence passes through an ignition chamber 60 having a burner 59 that is fed with natural gas or the like through a gas pipe 61. The burner 59 is configured to inject a flame 62 into the ignition chamber 60 to ignite any flammable elements and compounds that still remain in the smoke after the initial burning within burner 13.

Having been subjected to the flame 62, the smoke traverses a second fibrous filter 58, which removes particulates created in the ignition chamber, and is delivered to a conduit 63, which directs the smoke to a water tank 64. The water tank 64 contains water 66 preferably to a depth of about 20 feet. The conduit 63 extends toward the bottom of the tank 64 and its end is capped there by an aerator 67.

Having reached the lower end of conduit 63, the smoke is ejected into the water 66 through the aerator 67 and bubbles to the surface of the water within the tank 64. A stack or stand pipe 68 communicates with the water tank 64 and delivers smoke therefrom through a final filter 69 and into the atmosphere as shown. The smoke enters the atmosphere in the form of a fine mist from which most of the harmful elements discussed above have been removed.

OPERATION

In operation of this invention to remove harmful elements from industrial smoke, the smoke 14 is delivered from the furnace 13 to the plenum chamber 12 where it collects. As the piston 21 is reciprocated back and forth within the cylindrical chamber 19, the solenoid 49 is appropriately activated to open valves 41 and 43 as the piston moves to the right in FIG. 1 and to close these valves and open valves 42 and 44 as the piston moves to the left. In this way, smoke is continuously drawn from the plenum chamber 12 through one of the intake ducts 16 and 17 and is continuously ejected from the pump assembly 18 through one of the exhaust ducts 38 and 39. Compressed air ducts 71 can be provided if desired to force the last remaining smoke out of the chamber 19 as the piston 21 reaches the leftmost and rightmost extents of its travel within the cylinder. For example, when the piston 21 reaches the rightmost extent of its travel, compressed air can be injected into the space between the piston and the upstream end of the cylinder 22 to force any remaining smoke out of this space.

The smoke from the pump assembly 18 traverses the passageway of treatment station 52 where it is treated to remove impurities and harmful elements therefrom. More specifically, a fluid mist from the atomizer 53 tends to collect together and precipitate out of the stream larger particulate matter such as dust, ash, soot, and the like. These materials collect in the water at the bottom of the passageway and are delivered through the drain 56 to conduit 63, where it falls downwardly into the water tank 64. In this regard, it has been found preferable to provide a continuously circulating water supply 66 within the tank 64 such that impurities that collect in the water are removed to a remote location for disposal.

Having traversed the atomizer 53, the smoke passes through a filter 57, which preferably is a fibrous type filter that removes from the smoke smaller particulate matter not removed at the atomizer 53.

Next, the smoke stream traverses the ignition chamber 60 passing burner 59, where any combustible or flammable elements within the stream are ignited and burned. This tends to oxidize some of the elements within the smoke thus rendering them inert. A second fibrous filter 58 is provided to remove any particulate matter still present in the stream and to remove any particulate matter created during the burning process at the ignition chamber 60.

The smoke stream next moves down the conduit 63 and is ejected through aerator 67 into the water 66, where it bubbles to the surface. This bubbling action tends to scrub most of the remaining particulate matter from the smoke and removes certain metals and metal oxides before the smoke is expelled into the atmosphere.

From the water tank 64, the smoke moves up the stack 68 and is filtered one final time by a fibrous filter 69. The smoke is then ejected into the atmosphere in the form of a cool mist that is substantially harmless to the atmosphere. The harmful elements removed from the smoke stream, which tend to collect in the water 66 and the filters 57 and 58, can be properly handled and discarded such that it does not create any environmental hazard.

The invention has been described herein in terms of a preferred apparatus and methodology. It will be obvious, however, that numerous variations of the illustrated embodiment may well be made within the bounds of this invention. Water, for example, has been illustrated as the fluid medium used in the atomizer 53 and tank 66. However, other fluids such as alcohols, oils, and the like might be used in place of water with comparable results. Also, the piston drive mechanism of the preferred embodiment might well be replaced with any type of appropriate mechanism for reciprocating the piston within its cylinder. In addition, the methodology of this invention might easily be applied on a smaller scale to home incineration or even automobile pollution such that the industrial environment in which the illustrated embodiment operates should not be interpreted as a limitation upon the invention. Numerous additional modifications, additions, and deletions might well be made to the illustrated embodiments without departing from the spirit and scope of the invention as set forth in the claims.

I claim:

1. An apparatus for removing undesirable elements from an industrial smoke stream issuing from a furnace, boiler, incinerator, or other source, said apparatus comprising:

a plenum chamber coupled to receive smoke as it issues from the source;

a treatment station including a passageway sized to pass smoke from the source, and means within said passageway for removing undesirable elements from the smoke as it traverses the passageway;

pump means communicating with said plenum chamber and said passageway with said pump means being adapted to draw smoke from said plenum chamber and deliver the smoke to and through said passageway for treatment; and a smoke stack coupled to receive treated smoke from which undesirable elements have been removed and expel the treated smoke into the atmosphere;

said pump means comprising an elongated cylinder having substantially closed first and second ends, a piston mounted for reciprocating movement within said cylinder, motive means for reciprocating said piston back and forth within said cylinder, a first intake duct communicating between said plenum chamber and said first end of said cylinder, a second intake duct communicating between said plenum chamber and said second end of said cylinder, a first exhaust duct communicating between said passageway and said first end of said cylinder, a second exhaust duct communicating between said passageway and said second end of said cylinder, valve means disposed in each of said intake and exhaust ducts, and control means for actuating said valves to open said first intake duct and said first exhaust duct as said piston moves toward said second end of said cylinder and to open said second intake duct and said first exhaust duct and close said first intake duct and said second exhaust duct as said piston moves toward said first end of said cylinder, whereby smoke is drawn from the plenum chamber through the intake ducts and delivered to the passageway through the exhaust ducts as the piston reciprocates within the cylinder.

2. The apparatus of claim 1 and further comprising an elongated piston rod having first and second ends said piston rod being secured to said piston intermediate its ends and extending therefrom through said first and said second ends of said cylinder, said motive means being coupled to reciprocate said piston rod and thus said piston with respect to said cylinder.

3. The apparatus of claim 2 and wherein said piston rod is formed with a longitudinally extending passageway and wherein said motive means comprises first and second drive motors having drive sprockets and a continuous drive cable having a first flight and a second flight and extending through said longitudinally extending passageway and beyond the ends of said piston rod, said piston rod being securely attached to said first flight of said drive cable at a predetermined position therealong, said first and second ends of said drive cable extending around respective ones of said drive sprockets whereby activation of said first drive motor pulls said piston rod and said piston in one direction relative to said cylinder and activation of said second drive motor pulls said piston rod and said piston in the other direction relative to said cylinder.

* * * * *